US010298275B2

(12) United States Patent
Gharavi et al.

(10) Patent No.: US 10,298,275 B2
(45) Date of Patent: May 21, 2019

(54) OUTPHASING TRANSMIT AND RECEIVE WIRELESS SYSTEMS HAVING DUAL-POLARIZED ANTENNAS

(71) Applicant: Movandi Corporation, Newport Beach, CA (US)

(72) Inventors: Sam Gharavi, Irvine, CA (US); Ahmadreza Rofougaran, Newport Coast, CA (US); Maryam Rofougaran, Rancho Palos Verdes, CA (US); Farid Shirinfar, Granada Hills, CA (US)

(73) Assignee: Movandi Corporation, Newport Beach, CA (US)

( * ) Notice: Subject to any disclaimer, the term of this patent is extended or adjusted under 35 U.S.C. 154(b) by 0 days.

(21) Appl. No.: 15/432,018

(22) Filed: Feb. 14, 2017

(65) Prior Publication Data
US 2018/0234119 A1 Aug. 16, 2018

(51) Int. Cl.
*H04B 1/04* (2006.01)
*H04B 7/10* (2017.01)

(52) U.S. Cl.
CPC .............. *H04B 1/04* (2013.01); *H04B 7/10* (2013.01); *H04B 2001/0416* (2013.01); *H04B 2001/0433* (2013.01)

(58) Field of Classification Search
USPC ...................................... 455/101, 105, 562.1
See application file for complete search history.

(56) References Cited

U.S. PATENT DOCUMENTS

| 6,307,502 B1 * | 10/2001 | Marti-Canales ..... G01K 11/006 342/351 |
| 6,678,430 B1 * | 1/2004 | Noe ...................... G02F 1/0136 359/484.01 |
| 8,482,462 B2 | 7/2013 | Komijani |
| 2008/0163693 A1 * | 7/2008 | Sfez ........................ G01V 11/00 73/627 |

(Continued)

OTHER PUBLICATIONS

Baggett, Benjamin M.W. *Optimization of Aperiodically Spaced Phased Arrays for Wideband Applications*. MS Thesis. Virginia Polytechnic Institute and State University, 2011. pp. 1-137.

*Primary Examiner* — Wednel Cadeau
(74) *Attorney, Agent, or Firm* — Farjami & Farjami LLP

(57) ABSTRACT

An outphasing transmitter includes a decomposition block, first and second power amplifiers, and a dual-polarized antenna in a phased array antenna panel. The decomposition block decomposes a composite input signal into first and second decomposed RF signals. The first and second decomposed RF signals are coupled to the first and second power amplifiers. The first power amplifier is coupled to a vertically-polarized probe, and the second power amplifier is coupled to a horizontally-polarized probe. A plurality of dual-polarized antennas may be utilized. The first power amplifier is coupled to each vertically-polarized probe; while the second power amplifier is coupled to each horizontally-polarized probe. Alternatively, the first power amplifier may be coupled to vertically-polarized probes in each odd column, and to horizontally-polarized probes in each even column; while the second power amplifier may be coupled to horizontally-polarized probes in each odd col- (Continued)

umn, and to vertically-polarized probes in each even column.

13 Claims, 4 Drawing Sheets

(56) References Cited

U.S. PATENT DOCUMENTS

| | | | |
|---|---|---|---|
| 2010/0149039 A1* | 6/2010 | Komijani | H04B 7/0617 342/377 |
| 2014/0035731 A1* | 2/2014 | Chan | G06K 7/0008 340/10.3 |
| 2015/0341098 A1 | 11/2015 | Piero | |

* cited by examiner

OUTPHASING TRANSMIT AND RECEIVE WIRELESS SYSTEMS HAVING DUAL-POLARIZED ANTENNAS

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection," and U.S. patent application Ser. No. 15/226,785, filed on Aug. 2, 2016, and titled "Large Scale Integration and Control of Antennas with Master Chip and Front End Chips on a Single Antenna Panel," and U.S. patent application Ser. No. 15/255,656, filed on Sep. 2, 2016, and titled "Novel Antenna Arrangements and Routing Configurations in Large Scale Integration of Antennas with Front End Chips in a Wireless Receiver," and U.S. patent application Ser. No. 15/256,038 filed on Sep. 2, 2016, and titled "Transceiver Using Novel Phased Array Antenna Panel for Concurrently Transmitting and Receiving Wireless Signals," and U.S. patent application Ser. No. 15/256,222 filed on Sep. 2, 2016, and titled "Wireless Transceiver Having Receive Antennas and Transmit Antennas with Orthogonal Polarizations in a Phased Array Antenna Panel," and U.S. patent application Ser. No. 15/278,970 filed on Sep. 28, 2016, and titled "Low-Cost and Low-Loss Phased Array Antenna Panel," and U.S. patent application Ser. No. 15/279,171 filed on Sep. 28, 2016, and titled "Phased Array Antenna Panel Having Cavities with RF Shields for Antenna Probes," and U.S. patent application Ser. No. 15/279,219 filed on Sep. 28, 2016, and titled "Phased Array Antenna Panel Having Quad Split Cavities Dedicated to Vertical-Polarization and Horizontal-Polarization Antenna Probes," and U.S. patent application Ser. No. 15/335,034 filed on Oct. 26, 2016, and titled "Lens-Enhanced Phased Array Antenna Panel," and U.S. patent application Ser. No. 15/335,179 filed on Oct. 26, 2016, and titled "Phased Array Antenna Panel with Configurable Slanted Antenna Rows," and U.S. patent application Ser. No. 15/355,967 filed on Nov. 18, 2016, and titled "Phased Array Antenna Panel with Enhanced Isolation and Reduced Loss," and U.S. patent application Ser. No. 15/356,172 filed on Nov. 18, 2016, and titled "Phased Array Antenna Panel Having Reduced Passive Loss of Received Signals." The disclosures of all of these related applications are hereby incorporated fully by reference into the present application.

BACKGROUND

Amplifying RF signals with time-varying amplitude (also referred to as "variable-envelope signals") is not as power efficient as amplifying RF signals with constant amplitude (also referred to as "constant-envelope signals"). The reason is that power amplifiers utilized to amplify and transmit constant envelope signals could be more nonlinear (and hence more efficient) as compared to power amplifiers utilized to amplify and transmit variable envelope signals. On the other hand, communicating using RF signals with time-varying amplitude is more spectral efficient than communicating using RF signals with constant amplitude and as such most high-data-rate modern standards such as 802.11 Wireless LAN and cellular LTE and 5G use variable envelope signals.

In one existing solution, a variable amplitude signal is decomposed into two (or more) constant-amplitude signals, and the constant-amplitude signals are amplified using separate power amplifiers. A combiner is then used in the transmitter to combine the two amplified versions of the decomposed components, and the combined signal is then transmitted over the air by the transmitter's antenna. This method is generally known as linear amplification using nonlinear components (LINC), also known as outphasing. One shortcoming of this solution is that if the combiner is an isolating combiner, for example a Wilkinson combiner, some power will be lost in the resistor within the combiner due to the difference between the phases of the two outphasing components that are combined. Alternatively, if the combiner is a loss-less combiner, it will generally be non-isolating and the two power amplifiers feeding the combiner will modulate each other, which will reduce the linearity of the power amplifiers and hence increase the error vector magnitude (EVM) of the signal.

Thus, there is a need in the art to use phased array antenna panels, for example, phased array antenna panels with vertically-polarized probes and horizontally-polarized probes, to achieve a transmitter and a wireless communication system that overcomes the deficiencies in the art.

SUMMARY

The present disclosure is directed to outphasing transmit and receive wireless systems having dual-polarized antennas, substantially as shown in and/or described in connection with at least one of the figures, and as set forth in the claims.

DETAILED DESCRIPTION

Figure 1A:
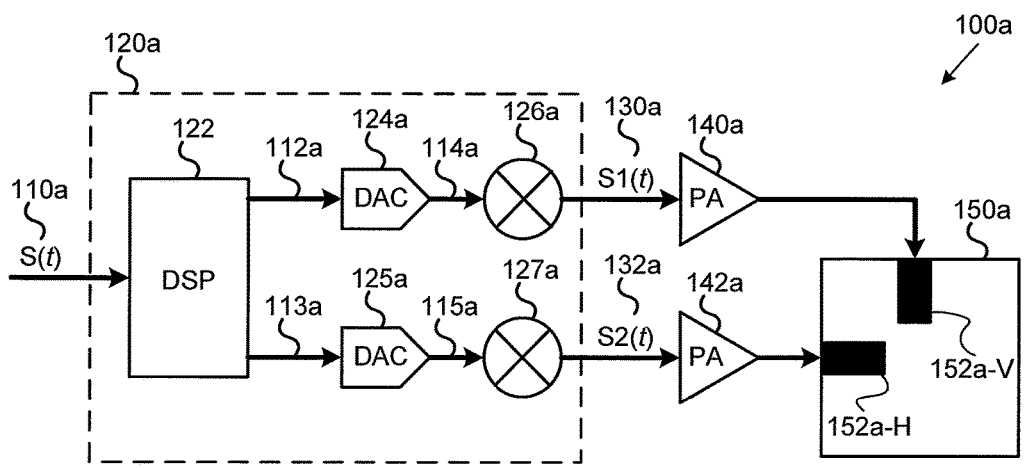
FIG. 1A illustrates an exemplary system diagram of a portion of an exemplary outphasing transmitter according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A illustrates an exemplary system diagram of a portion of an exemplary outphasing transmitter according to one implementation of the present application. As illustrated in FIG. 1A, outphasing transmitter 100a includes decomposition block 120a, having digital signal processor (DSP) 122, digital-to-analog converters (DACs) 124a and 125a, and mixers 126a and 127a, power amplifiers 140a and 142a, and dual-polarized antenna 150a, having vertically-polarized probe 152a-V and horizontally-polarized probe 152a-H.

As illustrated in FIG. 1A, composite digital input signal 110a is provided to decomposition block 120a. Composite input signal 110a is generally an amplitude and phase modulated signal. Composite input signal 110a may be provided by a modem (not shown in FIG. 1A). In one implementation, a single RF front end chip may be associated with a single dual-polarized antenna, such as dual-polarized antenna 150a. In various implementations, a single RF front end chip may be associated with four, six, eight, or any number of dual-polarized antennas. For example, four, six, eight, or any number of dual-polarized antennas 150a can be associated with a single RF front end chip. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, composite input signal 110a is a variable envelope signal defined by S(t) 110 in equation (1) below:

$$S(t)e^{j\omega t} = A(t)e^{j\omega t + j\beta(t)} \quad \text{Equation (1)}$$

where S(t) represents the composite input signal, and A(t) represents the time varying envelope.

As shown in FIG. 1A, decomposition block 120a is configured to decompose variable amplitude (or variable envelope) composite input signal 110a into constant amplitude (or constant envelope) decomposed radio frequency (RF) signals 130a and 132a. In decomposition block 120a, DSP 122 decomposes variable amplitude composite input signal 110a into constant amplitude decomposed digital signals 112a and 113a. Constant amplitude decomposed digital signals 112a and 113a can have a single constant amplitude level in one implementation. In another implementation constant amplitude decomposed digital signals 112a and 113a can have a finite number of discrete amplitude levels. DSP 122 may be implemented, for example, using a field-programmable gate array (FPGA) or an ASIC chip. DSP 122 is coupled to DACs 124a and 125a. DACs 124a and 125a convert the constant amplitude decomposed digital signals 112a and 113a into constant amplitude decomposed analog signals 114a and 115a respectively. DACs 124a and 125a are coupled to mixers 126a and 127a respectively. Mixers 126a and 127a upconvert the constant amplitude decomposed analog signals 114a and 115a into constant amplitude decomposed RF signals 130a and 132a. Decomposition block 120a outputs constant amplitude decomposed RF signals 130a and 132a. Decomposition block 120a may include additional components, such as additional signal conditioning circuitry such as phase shifters or time delays in a phased array.

In the present implementation, decomposed RF signals 130a and 132a are constant amplitude RF signals defined by respective constant amplitude components S1(t) 130 and S2(t) 132 in equation (2) below.

In the present implementation, decomposed RF signals 130a and 132a are constant amplitude RF signals defined by respective constant amplitude components S1(t) 130 and S2(t) 132 in equation (2) below.

$$S(t)e^{j\omega t} = A(t)e^{j\omega t + j\beta(t)} = \underbrace{A_0 e^{j\omega t + j\beta(t) + j\alpha(t)}}_{S1(t)e^{j\omega t}} + \underbrace{A_0 e^{j\omega t + j\beta(t) - j\alpha(t)}}_{S2(t)e^{j\omega t}} \quad \text{Equation (2)}$$

where S1(t) and S2(t) represent the decomposed RF signals, $A_0$ represents the constant amplitude (or constant envelope) of S1(t) and S2(t), and jωt+jβ(t)+jα(t) and jωt+jβ(t)−jα(t) represent the variable phase information of S1(t) and S2(t), using the two variables β and α. Further details regarding decomposition of a variable amplitude signal into constant amplitude signals (also referred to as "outphasing") can be found in U.S. Pat. No. 8,482,462 issued to Komijani et al., which is fully incorporated herein by reference.

As illustrated in FIG. 1A, decomposition block 120a is coupled to power amplifiers 140a and 142a. Power amplifiers 140a and 142a amplify constant amplitude decomposed RF signals 130a and 132a respectively. Power amplifiers 140a and 142a can be placed sufficiently apart from each other and provided respective RF shields so as to minimize any inter-modulation or interference between these two power amplifiers. Power amplifiers 140a and 142a are coupled to dual-polarized antenna 150a at vertically-polarized probe 152a-V and horizontally-polarized probe 152a-H respectively. Dual-polarized antenna 150a may be, for example, a dual-polarized patch antenna, a dual-polarized dipole antenna, or a dual-polarized slot antenna. Dual-polarized antenna 150a may transmit amplified constant amplitude decomposed RF signal 130a using vertically-polarized probe 152a-V. Dual-polarized antenna 150a may also transmit amplified constant amplitude decomposed RF signal 132a using horizontally-polarized probe 152a-H.

By decomposing variable amplitude composite input signal 110a into constant amplitude decomposed RF signals 130a and 132a prior to their amplification, power amplifiers 140a and 142a operate with more power efficiency and at a lower back off. Moreover, power amplifiers 140a and 142a exhibit less non-linearity and introduce less distortion than would a power amplifier utilized to amplify variable amplitude composite signal 110a without decomposition. In addition, an on-PCB or on-chip combiner is not used in outphasing transmitter 100a, and does not cause loss or inter-modulation between power amplifiers 140a and 142a. Further, by utilizing dual-polarized antenna 150a, outphasing transmitter 100a transmits two constant amplitude decomposed RF signals using a single antenna element 150a. Thus, outphasing transmitter 100a efficiently transmits constant amplitude decomposed RF signal 130a as a vertically-polarized signal using vertically-polarized probe 152a-V, and efficiently transmits constant amplitude decomposed RF signal 132a as a horizontally-polarized signal using horizontally-polarized probe 152a-H.

Although the present application refers to "vertically-polarized" probe 152a-V and "horizontally-polarized" probe 152a-H, the terms "vertically-polarized" and "horizontally-polarized" do not necessarily mean that polarizations are (or are required to be) precisely and mathematically vertical or horizontal; the tefins "vertically-polarized" and "horizontally-polarized" are used merely as a short-hand reference and for convenience to refer to any two polarizations of an antenna. For example, dual-polarized antenna 150a may have polarizations substantially or approximately at ±45 degrees. In other implementations, the antenna polarizations may be non-orthogonal.

Figure 1B:
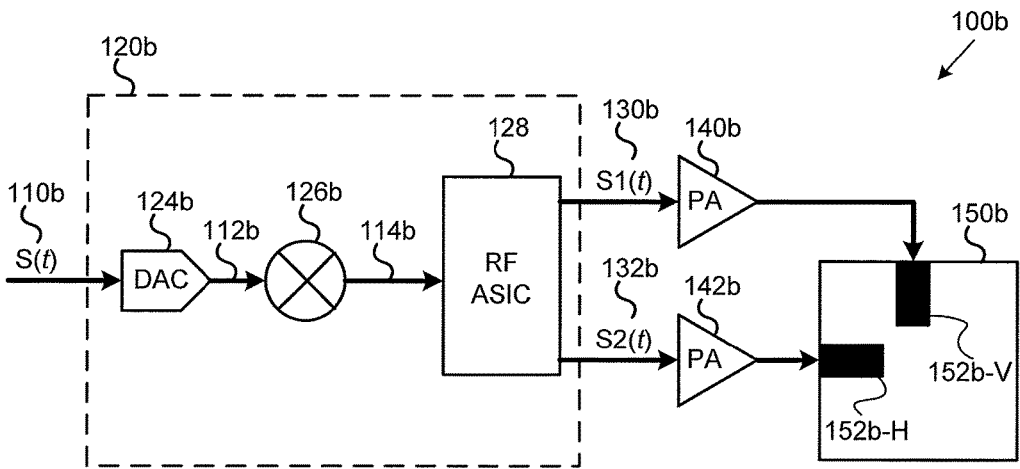
FIG. 1B illustrates an exemplary system diagram of a portion of an exemplary outphasing transmitter according to one implementation of the present application.

FIG. 1B illustrates an exemplary system diagram of a portion of an exemplary outphasing transmitter according to one implementation of the present application. As illustrated in FIG. 1B, outphasing transmitter 100b includes decomposition block 120b, having, DAC 124b, mixer 126b, and RF application-specific integrated circuit (RF ASIC) 128, power amplifiers 140b and 142b, and dual-polarized antenna 150b, having vertically-polarized probe 152b-V and horizontally-polarized probe 152b-H.

As illustrated in FIG. 1B, composite input signal 110b is provided to decomposition block 120b. Composite input signal 110b is generally an amplitude and phase modulated signal. Composite input signal 110b may be provided by a modem (not shown in FIG. 1B). In one implementation, a single RF front end chip may be associated with a single dual-polarized antenna, such as dual-polarized antenna 150b. In various implementations, a single RF front end chip may be associated with four, six, eight, or any number of dual-polarized antennas. For example, four, six, eight, or any number of dual-polarized antennas 150b can be associated with a single RF front end chip. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, composite input signal 110b is a variable envelope signal defined by S(t) 110 in equation (1) above. As shown in FIG. 1B, decomposition block 120b is configured to decompose variable amplitude (or variable envelope) composite input signal 110b into constant amplitude (or constant envelope) decomposed RF signals 130b and 132b. In decomposition block 120b, DAC 124b converts variable amplitude composite input signal 110b into variable amplitude analog signal 112b. DAC 124b is coupled to mixer 126b. Mixer 126b upconverts variable amplitude analog signal 112b into variable amplitude RF signal 114b. Mixer 126b is coupled to RF ASIC 128. RF ASIC 128 decomposes variable amplitude RF signal 114b into constant amplitude decomposed RF signals 130b and 132b. Decomposition block 120b outputs constant amplitude decomposed RF signals 130b and 132b. Decomposition block 120b may include additional components, such as additional signal conditioning circuitry, for example, phase shifters or time delays in a phased array system. In the present implementation, decomposed RF signals 130b and 132b are constant amplitude RF signals defined by respective constant amplitude components S1(t) 130 and S2(t) 132 in equation (2) above.

As illustrated in FIG. 1B, decomposition block 120b is coupled to power amplifiers 140b and 142b. Power amplifiers 140b and 142b amplify constant amplitude decomposed RF signals 130b and 132b respectively. Power amplifiers 140a and 142a can be placed sufficiently apart from each other and provided respective RF shields so as to minimize any inter-modulation or interference between these two power amplifiers. Power amplifiers 140b and 142b are coupled to dual-polarized antenna 150b at vertically-polarized probe 152b-V and horizontally-polarized probe 152b-H respectively. Dual-polarized antenna 150b may be, for example, a dual-polarized patch antenna, a dual-polarized dipole antenna, or a dual-polarized slot antenna. Dual-polarized antenna 150b may transmit amplified constant amplitude decomposed RF signal 130b using vertically-polarized probe 152b-V. Dual-polarized antenna 150b may also transmit amplified constant amplitude decomposed RF signal 132b using horizontally-polarized probe 152b-H.

By decomposing variable amplitude composite input signal 110b into constant amplitude decomposed RF signals 130b and 132b prior to their amplification, power amplifiers 140b and 142b operate with more power efficiency. Moreover, power amplifiers 140b and 142b exhibit less non-linearity and introduce less distortion than would a power amplifier utilized to amplify variable amplitude composite signal 110b without decomposition. In addition, a combiner is not used in outphasing transmitter 100b, and does not cause loss or inter-modulation between power amplifiers 140b and 142b. Further, by utilizing dual-polarized antenna 150b, outphasing transmitter 100b transmits two constant amplitude decomposed RF signals using a single antenna element 150b. Thus, outphasing transmitter 100b efficiently transmits constant amplitude decomposed RF signal 130b as a vertically-polarized signal using vertically-polarized probe 152b-V, and efficiently transmits constant amplitude decomposed RF signal 132b as a horizontally-polarized signal using horizontally-polarized probe 152b-H.

Figure 2:
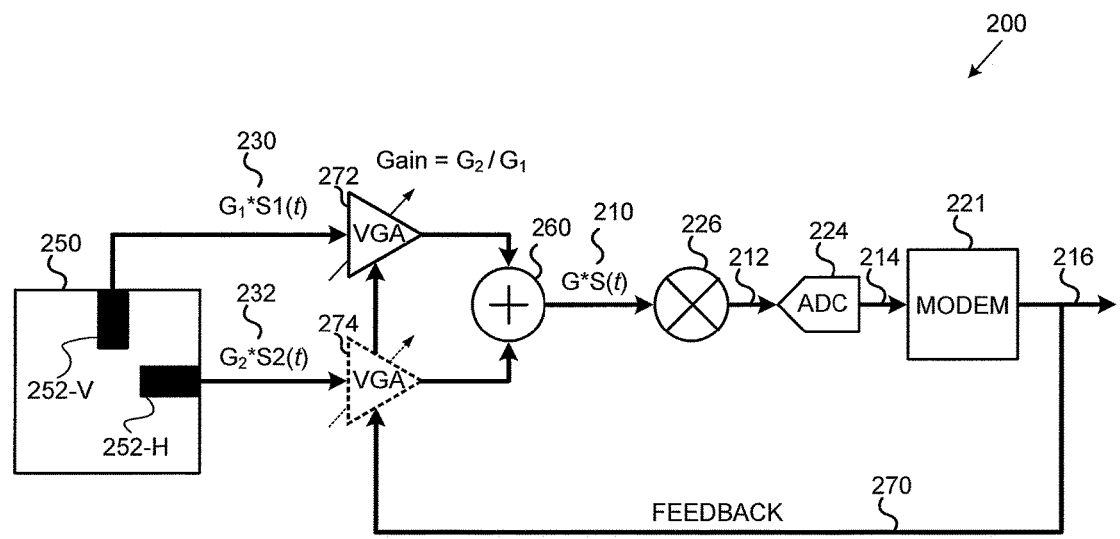
FIG. 2 illustrates an exemplary system diagram of a portion of an exemplary outphasing receiver according to one implementation of the present application.

FIG. 2 illustrates an exemplary system diagram of a portion of an exemplary outphasing receiver according to one implementation of the present application. As illustrated in FIG. 2, outphasing receiver 200 includes dual-polarized antenna 250, having vertically-polarized probe 252-V and horizontally-polarized probe 252-H, variable-gain amplifier (VGA) 272, optional VGA 274, combiner 260, mixer 226, analog-to-digital converter (ADC) 224, modem 221, output digital signal 216, and feedback line 270. Outphasing receiver 200 in FIG. 2 can be used in conjunction with outphasing transmitter 100a of FIG. 1A or outphasing transmitter 100b of FIG. 1B.

Dual-polarized antenna 250 is configured to receive vertically-polarized signals using vertically-polarized probe 252-V and to receive horizontally-polarized signals using horizontally-polarized probe 252-H. For example, dual-polarized antenna 250 may receive constant amplitude decomposed RF signal 130a of FIG. 1A using vertically-polarized probe 252-V and may receive constant amplitude decomposed RF signal 132a of FIG. 1A using horizontally-polarized probe 252-H. More specifically, dual-polarized antenna 250 receives scaled versions of constant amplitude decomposed RF signals 130a and 132a, defined by $G_1*S1(t)$ 230 and $G_2*S2(t)$ 232 respectively, where $G_1$ and $G_2$ are respective gains of decomposed RF signals 130a and 132a at outphasing receiver 200. Dual-polarized antenna 250 may be, for example, a dual-polarized patch antenna, a dual-polarized dipole antenna, or a dual-polarized slot antenna.

As illustrated in FIG. 2, dual-polarized antenna 250 is coupled to combiner 260 through VGA 272 and optional VGA 274. Combiner 260 combines scaled constant amplitude decomposed RF signals 230 and 232 into a scaled variable amplitude composite RF signal, defined by $G*S(t)$ 210. Scaled variable amplitude composite RF signal 210 is a scaled RF version of the original variable amplitude composite input signal 110a (or 110b). Combiner 260 is coupled to mixer 226. Mixer 226 downconverts scaled variable amplitude composite RF signal 210 into scaled variable amplitude composite analog signal 212. Mixer 226 is coupled to ADC 224. ADC 224 converts scaled variable amplitude composite analog signal 212 into scaled variable amplitude composite digital signal 214. ADC 224 is coupled to modem 221. Modem 221 produces an output digital signal 216 based on scaled variable amplitude composite digital signal 214.

Thus, outphasing receiver 200 is configured to receive polarized constant amplitude decomposed RF signals, such as constant amplitude decomposed RF signals 130a and 132a, and compose a variable amplitude composite RF signal, such as scaled variable amplitude composite RF signal 210. Since the constant amplitude RF signals are combined at the receiver end (e.g., at outphasing receiver 200) to recompose the original variable amplitude RF signal, the need for combining RF signals at the transmitter end is avoided. Moreover, VGA 272 and optional VGA 274 are utilized to correct for the gain mismatch between the vertical and horizontal polarizations. Further, by utilizing dual-polarized antenna 250, outphasing receiver 200 receives two decomposed RF signals using a single antenna element 250. Thus, outphasing receiver 200 efficiently receives constant amplitude decomposed RF signal 130a (or 130b) as a vertically-polarized signal using vertically-polarized probe 252-V, efficiently receives constant amplitude decomposed RF signal 132a (or 132b) as a horizontally-polarized signal using horizontally-polarized probe 252-H, and efficiently recomposes them to generate scaled variable amplitude composite RF signal 210.

As further illustrated in FIG. 2, modem 221 is coupled to feedback line 270. Different paths taken by constant amplitude decomposed RF signals, such as different paths taken by decomposed RF signals 130a (or 130b) and 132a (or 132b), can cause imbalance in both gain and phase, and result in an increased bit error rate (BER) for the output digital signal 216 at the receiver. Outphasing receiver 200 can apply gain and phase adjustment to scaled constant amplitude decomposed RF signals 230 and 232 using feedback line 270 in order to compensate for such imbalance. For example, as show in FIG. 2, vertically-polarized probe 252-V is coupled to VGA 272 and scaled constant amplitude decomposed RF signal 230 is input to VGA 272. Feedback line 270 couples modem 221 to VGA 272. Feedback line 270 uses the BER as feedback to adjust the gain of VGA 272 to compensate for gain imbalance and decrease the BER. In the present implementation, the gain of VGA 272 is adjusted to $G_2/G_1$, where $G_1$ and $G_2$ are respective gains of decomposed RF signals 130a (or 130b) and 132a (or 132b) at outphasing receiver 200. In various implementations, feedback line 270 may use optional VGA 274, and the gains of VGA 272 and optional VGA 274 may be adjusted to values other than $G_2/G_1$. Feedback line 270 may include additional components, such as phase adjustment circuitry.

Figure 3:
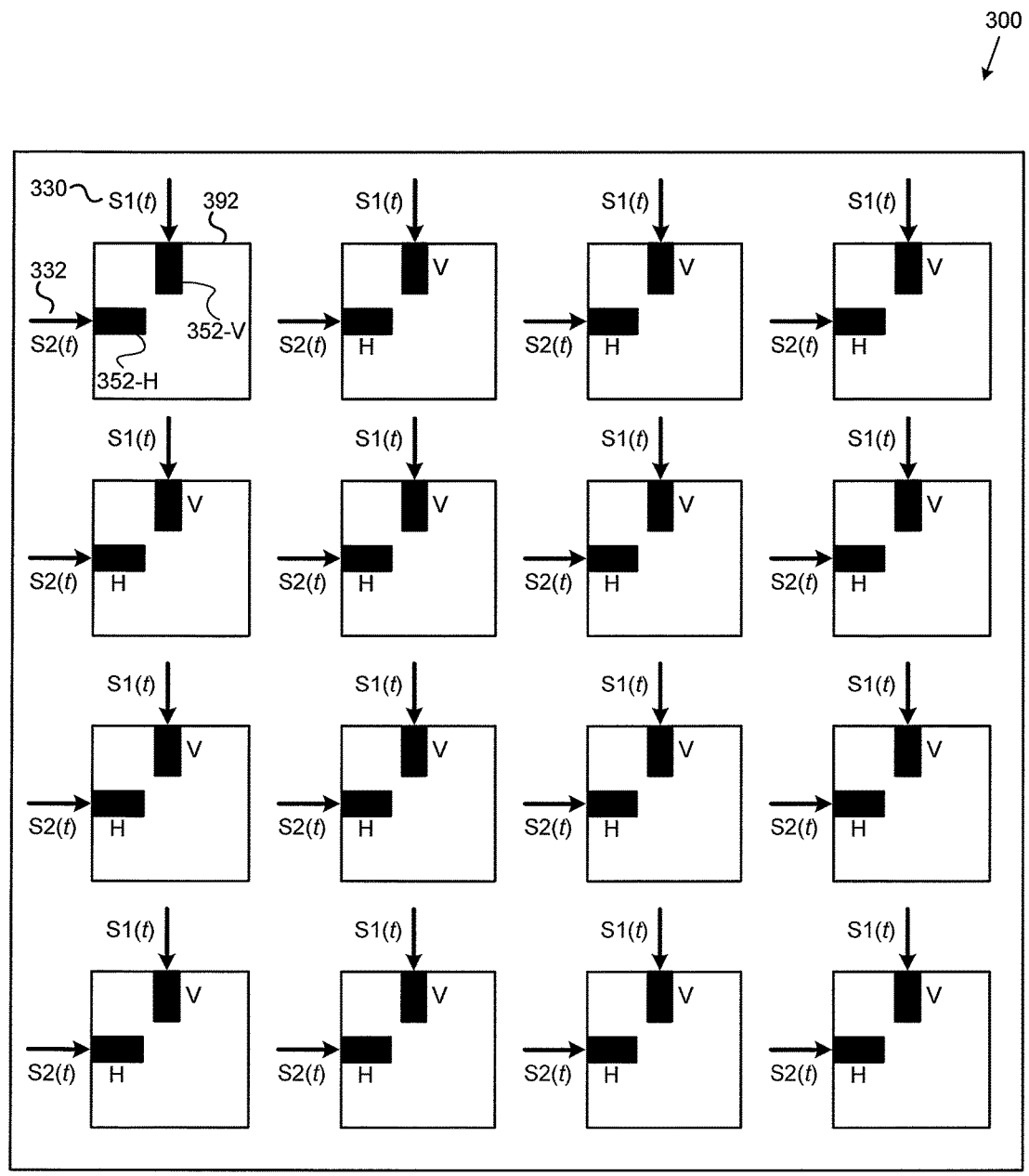
FIG. 3 illustrates a layout diagram of a portion of an exemplary phased array antenna panel according to one implementation of the present application.

FIG. 3 illustrates a layout diagram of a portion of an exemplary phased array antenna panel according to one implementation of the present application. As illustrated in FIG. 3, phased array antenna panel 300 includes a plurality of dual-polarized antennas 392, having vertically-polarized probes 352-V and horizontally-polarized probes 352-H. In the present implementation, dual-polarized antennas 392 have a square shape and are arranged in a grid pattern in phased array antenna panel 300. In one implementation, the distance between one dual-polarized antenna and an adjacent dual-polarized antenna is a fixed distance, such as a quarter wavelength (i.e., $\lambda/4$). Although FIG. 3 shows sixteen (16) dual-polarized antennas 392, only a portion of phased array antenna panel 300 is shown in FIG. 3. In practice, for example when used in conjunction with 5G wireless communications (5th generation mobile networks or 5th generation wireless systems), phased array antenna panel 300 may be much larger, and may have one hundred and forty four (144) dual-polarized antennas 392, arranged, for example, in a twelve (12) by twelve (12) grid pattern. When used in conjunction with commercial geostationary communication satellites or low earth orbit satellites, phased array antenna panel 300 may be even larger, and have, for example, four hundred (400) dual-polarized antennas 392. In other examples, phased array antenna panel 300 may have any other number of dual-polarized antennas 392. In one implementation, dual-polarized antennas 392 may have a shape other than a square, such as a circle. In practice, vertically-polarized probes 352-V and horizontally-polarized probes 352-H may be situated in or over cubical or cylindrical cavities that accommodate more efficient transmission or reception of RF signals. Thus, antenna element 392 in FIG. 3 may represent a top view of a cubical cavity housing vertically-polarized probes 352-V and horizontally-polarized probes 352-H. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, dual-polarized antennas 392 may be arranged in a pattern other than a grid. In one implementation, the distance between one dual-polarized antenna and an adjacent dual-polarized antenna may be greater than a quarter wavelength (i.e., greater than $\lambda/4$).

Phased array antenna panel 300 in FIG. 3 may be used as part of an outphasing transmitter, such as outphasing transmitter 100a of FIG. 1A or outphasing transmitter 100b of FIG. 1B. Any of dual-polarized antennas 392 in FIG. 3 generally corresponds to dual-polarized antenna 150a (or 150b). In one implementation, a single power amplifier 140a (or 140b) is coupled to a single one of vertically-polarized probes 352-V. In various implementations, a single power amplifier 140a (or 140b) may be coupled to four, six, eight, or any number of vertically-polarized probes 352-V. For example, power amplifier 140a (or 140b) may be coupled to each of vertically-polarized probes 352-V, using, for example, a splitter, a plurality of amplifier cells, or other suitable means. Likewise, a single power amplifier 142a (or 142b) may be coupled to one or any number of horizontally-polarized probes 352-H. Thus, as illustrated in FIG. 3, constant amplitude decomposed RF signal 330 is provided to each of vertically-polarized probes 352-V in phased array antenna panel 300, and constant amplitude decomposed RF signal 332 is provided to each of horizontally-polarized probes 352-H in phased array antenna panel 300.

In the present implementation, phased array antenna panel 300 is a flat panel array employing dual-polarized antennas 392 coupled to associated active circuits to form a beam for transmission. In one implementation, the beam is formed fully electronically by means of phase and amplitude control circuits associated with dual-polarized antennas 392. An example of beam forming using phase and amplitude control circuits utilizing dual-polarized antennas is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 300 can provide fully electronic beamforming without the use of mechanical parts.

In 5G wireless communications, and wireless communications in relation to commercial geostationary satellites, low earth orbit satellites, and other beamforming applications, a phased array antenna panel employs numerous power amplifiers that use much of the phased array antenna panel's power. By decomposing a variable amplitude composite input signal into constant amplitude decomposed RF signals 330 and 332 prior to their amplification, power amplifiers in phased array antenna panel 300 can operate with more power efficiency and less non-linearity. Thus, phased array antenna panel 300 significantly improves power efficiency and performance in applications that employ numerous power amplifiers. Moreover, by utilizing dual polarized antennas 392, phased array antenna panel 300 efficiently transmits constant amplitude decomposed RF signal 330 as a vertically-polarized signal using vertically-polarized probes 352-V, and efficiently transmits constant amplitude decomposed RF signal 332 as a horizontally-polarized signal using horizontally-polarized probes 352-H.

Figure 4:
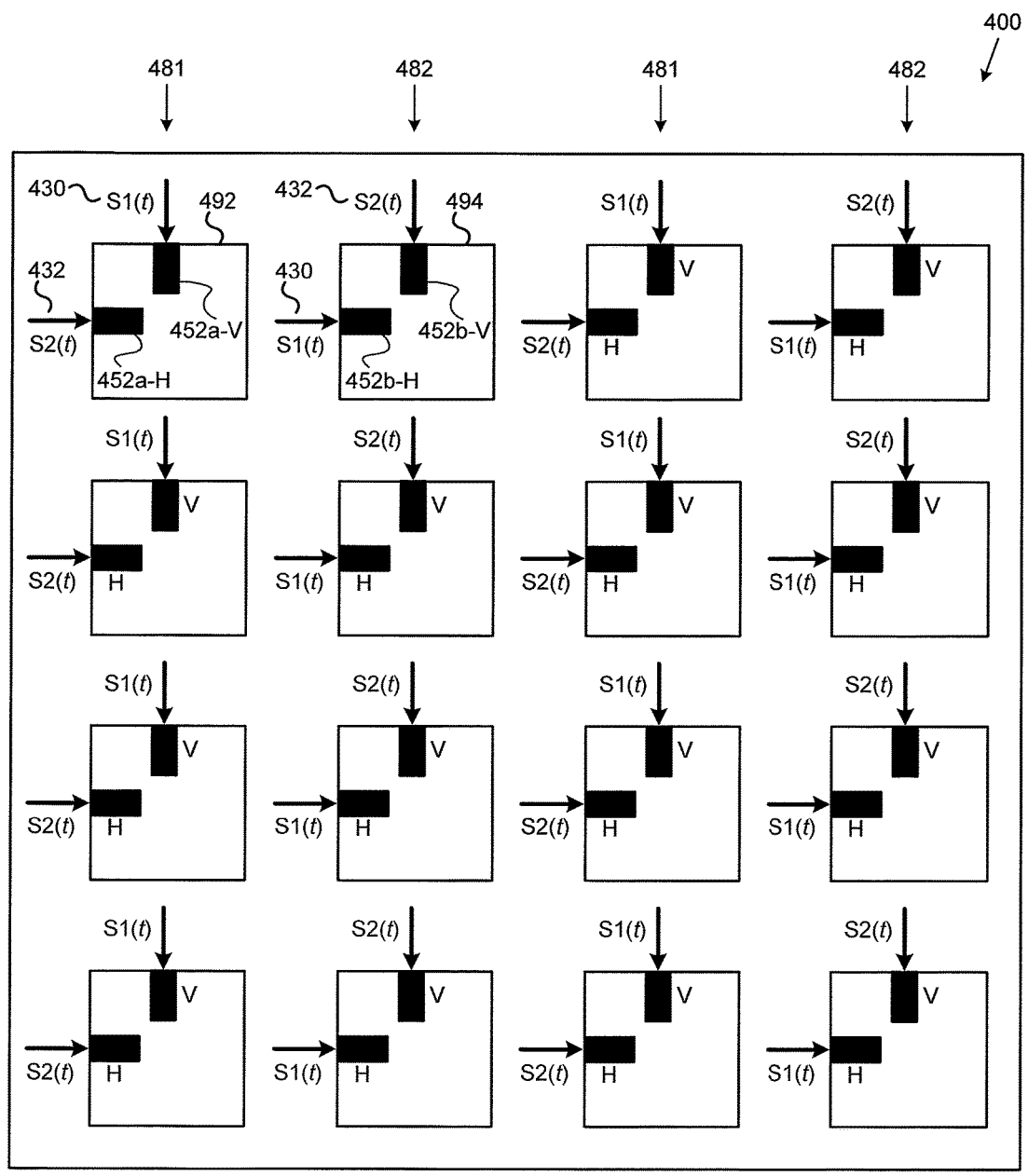
FIG. 4 illustrates a layout diagram of a portion of an exemplary phased array antenna panel according to one implementation of the present application.

FIG. 4 illustrates a layout diagram of a portion of an exemplary phased array antenna panel according to one implementation of the present application. As illustrated in FIG. 4, phased array antenna panel 400 includes a plurality of dual-polarized antennas 492 and 494, having vertically-polarized probes 452a-V and 452b-V and horizontally-polarized probes 452a-H and 452b-H. In the present implementation, dual-polarized antennas 492 and 494 have a square shape and are arranged in a grid pattern in phased array antenna panel 400. In one implementation, the distance between one dual-polarized antenna and an adjacent dual-polarized antenna is a fixed distance, such as a quarter wavelength (i.e., λ/4). Although FIG. 4 shows sixteen (16) dual-polarized antennas 492 and 494, only a portion of phased array antenna panel 400 is shown in FIG. 4. In practice, for example when used in conjunction with 5G wireless communications (5th generation mobile networks or 5th generation wireless systems), phased array antenna panel 400 may be much larger, and may have one hundred and forty four (144) dual-polarized antennas 492 and 494, arranged, for example, in a twelve (12) by twelve (12) grid pattern. When used in conjunction with commercial geostationary communication satellites or low earth orbit satellites, phased array antenna panel 400 may be even larger, and have, for example, four hundred (400) dual-polarized antennas 492 and 494. In other examples, phased array antenna panel 400 may have any other number of dual-polarized antennas 492 and 494. In one implementation, dual-polarized antennas 492 and 494 may have a shape other than a square, such as a circle. In practice, vertically-polarized probes 452a-V and 452b-V and horizontally-polarized probes 452a-H and 452b-H may be situated in or over cubical or cylindrical cavities that accommodate more efficient transmission or reception of RF signals. Thus, antenna elements 492 and 494 in FIG. 4 may represent a top view of a cubical cavity housing vertically-polarized probes 452a-V and 452b-V and horizontally-polarized probes 452a-H and 452b-H. As stated above, examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, dual-polarized antennas 492 and 494 may be arranged in a pattern other than a grid. In one implementation, the distance between one dual-polarized antenna and an adjacent dual-polarized antenna may be greater than a quarter wavelength (i.e., greater than λ/4).

Phased array antenna panel 400 in FIG. 4 may be used as part of an outphasing transmitter, such as outphasing transmitter 100a of FIG. 1A or outphasing transmitter 100b of FIG. 1B. Any of dual-polarized antennas 492 and 494 in FIG. 4 generally corresponds to dual-polarized antenna 150a (or 150b). In one implementation, a single power amplifier 140a (or 140b) is coupled to a single one of vertically-polarized probes 452a-V or to a single one of horizontally-polarized probes 452b-H. In various implementations, a single power amplifier 140a (or 140b) may be coupled to four, six, eight, or any number of vertically-polarized probes 452a-V or horizontally-polarized probes 452b-H. For example, power amplifier 140a (or 140b) may be coupled to each of vertically-polarized probes 452a-V and to each of horizontally-polarized probes 452b-H, using, for example, a splitter, a plurality of amplifier cells, or other suitable means. Likewise, a single power amplifier 142a (or 142b) may be coupled to one or any number of horizontally-polarized probes 452a-H and vertically-polarized probes 452b-V.

As illustrated in FIG. 4, phased array antenna panel 400 includes odd columns 481 and even columns 482. Constant amplitude decomposed RF signal 430 is provided to each of vertically-polarized probes 452a-V in odd columns 481, and constant amplitude decomposed RF signal 432 is provided to each of horizontally-polarized probes 452a-H in odd columns 481. In an alternate fashion, constant amplitude decomposed RF signal 432 is provided to each of vertically-polarized probes 452b-V in even columns 482, and constant amplitude decomposed RF signal 430 is provided to each of horizontally-polarized probes 452b-H in even columns 482. As stated above, different paths taken by constant amplitude decomposed RF signals, such as different paths taken by constant amplitude decomposed RF signals 430 and 432, can cause imbalance in both gain and phase, and the receiver can apply gain and phase adjustment in order to compensate for such imbalance. In the present implementation, phased array antenna panel 400 transmits constant amplitude decomposed RF signals 430 and 432 alternately using vertically-polarized probes 452a-V and 452b-V and horizontally-polarized probes 452a-H and 452b-H between odd columns 481 and even columns 482. By utilizing a plurality of dual-polarized antennas 492 and 494 to alternate assignment of constant amplitude decomposed RF signals 430 and 432, phased array antenna panel 400 mitigates the imbalance between constant amplitude decomposed RF signals 430 and 432. In addition, phased array antenna panel 400 eliminates or reduces the need to perform gain and phase adjustment at the receiver end. For example, in FIG. 2, the gain of VGA 272 and the settling time of feedback line 270 can be reduced. The various implementations and advantages of power efficiency and improvement in non-linearity and performance when utilizing dual-polarized antennas discussed in relation to phased array antenna panel 300 in FIG. 3 may also apply to phased array antenna panel 400 in FIG. 4.

Thus, various implementations of the present application achieve a transmitter and a wireless communication system that overcome the deficiencies in the art by using phased array antenna panels having vertically-polarized probes and horizontally-polarized probes. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. An outphasing transmitter comprising:
a first dual-polarized antenna and a second dual-polarized antenna in a phased array antenna panel, said first dual-polarized antenna and said second dual-polarized antenna each comprising a vertically-polarized probe and a horizontally-polarized probe;
a decomposition block configured to decompose a composite input signal into a first decomposed RF signal and a second decomposed RF signal;
said first decomposed RF signal coupled to a first power amplifier;
said second decomposed RF signal coupled to a second power amplifier;
said vertically-polarized probe of said first dual-polarized antenna being coupled to said first power amplifier, and said horizontally-polarized probe of said first dual-polarized antenna being coupled to said second power amplifier;
said vertically-polarized probe of said second dual-polarized antenna being coupled to said second power amplifier, and said horizontally-polarized probe of said second dual-polarized antenna being coupled to said first power amplifier;
wherein said outphasing transmitter transmits said first decomposed RF signal concurrently using both a first polarization and a second polarization;
wherein said outphasing transmitter transmits said second decomposed RF signal concurrently using both said first polarization and said second polarization.

2. The outphasing transmitter of claim 1, wherein said first decomposed RF signal and said second decomposed RF signal comprise at least one constant amplitude signal, respectively.

3. The outphasing transmitter of claim 1, wherein said decomposition block comprises a digital signal processor (DSP).

4. The outphasing transmitter of claim 1, wherein said decomposition block comprises an RF application-specific integrated circuit (ASIC).

5. The outphasing transmitter of claim 1, wherein said first and second decomposed RF signals are combined by a receiver having at least one dual-polarized antenna having a respective vertically-polarized probe and a respective horizontally-polarized probe.

6. The outphasing transmitter of claim 1, wherein said first dual-polarized antenna comprises an antenna selected from the group consisting of a patch antenna, a dipole antenna, and a slot antenna.

7. The outphasing transmitter of claim 5, wherein at least one of said respective vertically-polarized probe and said respective horizontally-polarized probe is coupled to a variable gain amplifier whose gain is adjusted in said receiver to decrease a bit error rate (BER) of an output digital signal produced by said receiver.

8. An outphasing transmitter comprising:
a plurality of dual-polarized antennas in a phased array antenna panel, each said plurality of dual-polarized antennas comprising a vertically-polarized probe and a horizontally-polarized probe;
a decomposition block configured to decompose a composite input signal into a first decomposed RF signal and a second decomposed RF signal;
said first decomposed RF signal coupled to a first power amplifier;
said second decomposed RF signal coupled to a second power amplifier;
each said vertically-polarized probe in each odd column in said phased array antenna panel being coupled to said first power amplifier, and each said horizontally-polarized probe in each odd column in said phased array antenna panel being coupled to said second power amplifier;
each said vertically-polarized probe in each even column in said phased array antenna panel being coupled to said second power amplifier, and each said horizontally-polarized probe in each even column in said phased array antenna panel being coupled to said first power amplifier;
wherein said outphasing transmitter transmits said first decomposed RF signal concurrently using both a first polarization and a second polarization;
wherein said outphasing transmitter transmits said second decomposed RF signal concurrently using both said first polarization and said second polarization.

9. The outphasing transmitter of claim 8, wherein said first decomposed RF signal and said second decomposed RF signal are constant amplitude signals.

10. The outphasing transmitter of claim 8, wherein said decomposition block comprises a digital signal processor (DSP).

11. The outphasing transmitter of claim 8, wherein said decomposition block comprises an RF application-specific integrated circuit (ASIC).

12. The outphasing transmitter of claim 8, wherein said first and second decomposed RF signals are combined by a receiver having at least one dual-polarized antenna having a respective vertically-polarized probe and a respective horizontally-polarized probe.

13. The outphasing transmitter of claim 12, wherein at least one of said respective vertically-polarized probe and said respective horizontally-polarized probe is coupled to a variable gain amplifier whose gain is adjusted in said receiver to decrease a bit error rate (BER) of an output digital signal produced by said receiver.

* * * * *